Aug. 24, 1965    J. C. ABBEY ETAL    3,202,442
COUPLING
Filed May 19, 1961

INVENTORS
JOHN C. ABBEY
THOMAS E. HAWKINS

BY *Jerry K. Harness*

ATTORNEY

United States Patent Office 3,202,442
Patented Aug. 24, 1965

3,202,442
COUPLING
John C. Abbey, Parma, and Thomas E. Hawkins, Jackson, Mich., assignors to Aeroquip Corporation, Jackson, Mich., a corporation of Michigan
Filed May 19, 1961, Ser. No. 111,332
1 Claim. (Cl. 285—3)

The invention pertains to a fluid coupling and particularly relates to a coupling which may be employed with presealed and charged systems as employed in the refrigeration field, for example.

It is becoming a common practice in the manufacture of refrigeration, air conditioning, dehumidifying, and other arts employing compressors, condensers, evaporators, etc. to charge the component system with the proper refrigeration gas at the factory. Such precharged systems are then assembled at a later time, often at the site of application, and couplings are employed with the conduits of the system which prevent loss of the charge yet permit flow through the connected couplings once the components of the system are assembled. Couplings or end fittings of this type often employ rupturable membranes or diaphragms which seal the ends of the component conduits during manufacture and shipment, and are ruptured after the coupling is assembled.

The invention pertains to a coupling for use with systems as described above, and is concerned with a coupling of economical manufacture which prevents air inclusion into the system during coupling, and automatically ruptures the sealing diaphragms or membranes during the interconnection of the coupling halves. Many of the couplings heretofore known for this purpose are of complicated and expensive construction employing special diaphragm severing means, and it is a purpose of invention to provide this type of "one-shot" coupling which is dependable, economical, and relatively foolproof in operation.

It is a further object of the invention to provide a coupling employing rupturable diaphragms wherein means are provided for removing the diaphragms from the flow path of the coupling, after assembly, whereby the coupling provides relatively unrestricted flow therethrough.

A further object of the invention is to provide a coupling of the above type having negligible air inclusion characteristics wherein sealing means are employed permitting coupling and interconnection of the halves under pressure without leakage.

Another object of the invention is to provide a coupling of the above type having very dependable sealing characteristics wherein a metal-to-metal seal is achieved by the use of a hard metal ring which sealingly embeds itself into the coupling halves.

Figure 1:
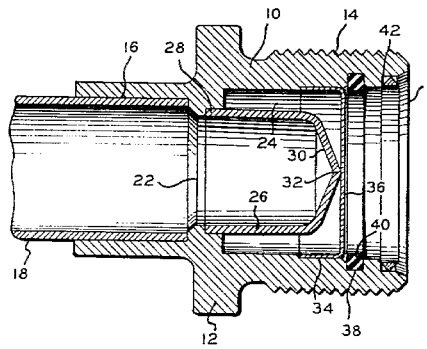
Figure 2:
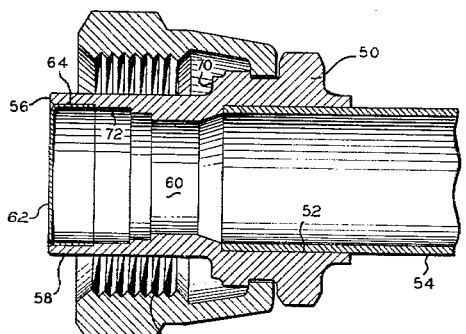
Figure 3:
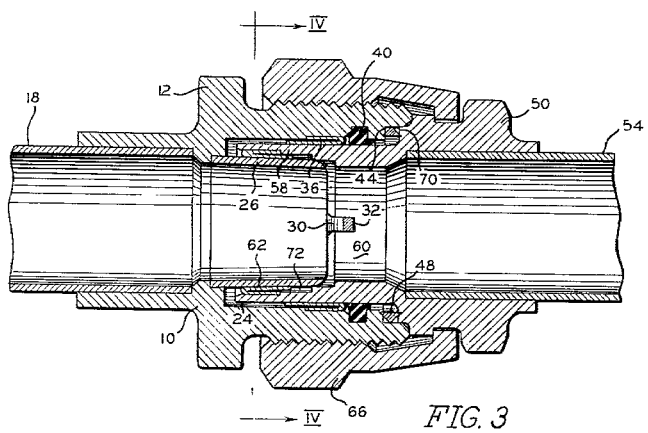
Figure 4:
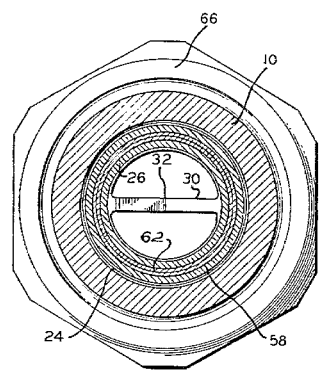
Figure 5:
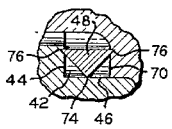

These and other objects of the invention arising from the relationships and details of the components of an embodiment thereof will be apparent from the following description and accompanying drawing wherein:

FIG. 1 is an elevational sectional view of the male half of a coupling in accord with the invention prior to rupture of the diaphragm thereof, FIG. 2 is an elevational sectional view of the female half of the coupling with the diaphragm in sealing position, FIG. 3 is an elevational sectional view of the coupling halves as assembled, in accord with the invention, FIG. 4 is an elevational sectional view of the assembly of FIG. 3 taken along section IV—IV thereof, and FIG. 5 is an enlarged detail sectional view of the metal-to-metal seal.

Referring to FIG. 1, the male coupling half comprises a tubular body member 10 having an annular flange 12 formed thereon having wrench flats defined thereon and body 10 is exteriorly threaded at 14. Body member 10 is provided with an inner end having a bore 16 defined therein for receiving the refrigeration system conduit 18, and the threads are adjacent the body member outer end 20. The conduit 18 is shown as attached to the body member with a soldered type joint; however, it will be appreciated that any type of conventional attaching means may be employed in affixing the body member 10 to the conduit associated therewith.

A passageway 22 is defined axially through body member 10 in communication with the conduit 18 and includes an enlarged cylindrical chamber 24 adjacent the outer body member end 20. A tubular sleeve member 26 is affixed concentrically within the chamber 24 being mounted upon the body member at 28. The sleeve member is of a slightly tapered configuration and is provided at its free end with a rib 30 which diametrically bridges the opposite sides of the sleeve. The rib 30 is of a relatively narrow width, see FIGS. 3 and 4, and is so formed as to define a point 32 which extends beyond the free end of the general sleeve configuration. The point 32 provides the piercing or penetrating of the sealing diaphragms as will be later apparent.

Several annular cylindrical grooves or recesses are defined in the wall of chamber 24. Groove 34 is for the purpose of locating and maintaining the diaphragm or membrane 36, groove 38 receives a resilient sealing ring 40 and recess 42 is for the purpose of positioning and maintaining the metal sealing ring 42 in position. The rupturable diaphragm 36 is preferably formed of a soft metal, such as brass, having a transversely extending portion which seals the chamber 24 and body member passage 22. The periphery of the diaphragm is provided with an axially extending flange which is received within the groove 34. It will be noted that the diaphragm inner surface is very closely related to the piercing point 32.

The recess 42 is of a considerable depth thereby defining a radially extending surface 44, and the axially extending surface 46 defines a shoulder or annular bore into which the metal sealing ring 48 may be snugly received, as with a light press fit. The sealing ring 48 is preferably of triangular configuration, as illustrated, and is of a metal which is harder than that of the metal forming the coupling halves. The resilient sealing member 40 may be of rubber or synthetic material and maintains sealing during interconnection of the coupling halves prior to operation of the metal sealing ring 48, as will be later apparent.

The female half of the coupling is shown in FIG. 2, and includes the tubular body member 50 provided with an inner end having a bore 52 receiving the conduit 54. The outer end of the body member is designated 56 and a cylindrical portion 58 is defined adjacent the outer end, having a diameter slightly less than that of the diameter of the chamber 24. The passageway 60 of the body member 50 is sealed by a rupturable diaphragm 62 of a configuration similar to that of the diaphragm 36. An annular groove 64 defined within the body portion 58 locates the diaphragm such that the plane of the transversely extending portion substantially coincides with the plane of the outer end 56 of the body member 50. An annular nut member 66 is rotatably connected to the body member 50 having internal threads 68 defined thereon for mating with the threads 14 of body member 10. A radially extending surface 70 is defined on the body member adjacent the cylindrical portion 58 for engagement with the metal seal ring 48, as will be apparent in FIG. 3.

It therefore will be appreciated that upon the body members 10 and 50 being mounted on the conduits 18 and 54, respectively, the systems associated with the conduits may be charged with refrigerant or other fluids or pressurized gases without leakage from the system. When it is desired to assemble the conduits 18 and 54 in fluid communication, the operator aligns the axes of body members 10 and 50 and brings the members together until the threads 68 of nut 66 engage the threads 14. Rotation of the nut 66 a turn or so will establish proper connection of the threads and bring the body member outer end 56 into engagement with the outer surface of the diaphragm 36.

At this time the outer surfaces of the diaphragms 36 and 62 will be in parallel contacting relationship thereby excluding air from between the diaphragms. Also, the resilient seal 40 will be sealingly engaging the outer surface of the cylindrical portion 58. Further rotation of nut 66 will axially move the cylindrical portion 58 into the chamber 24 wherein the outer end 56 and the diaphragm 62, primarily the outer end, force the diaphragm 36 into the rib 30. Such action causes the point 32 to pierce the diaphragm 36, and further rotation of the nut to axially insert the body member portion 58 further into the chamber 24 causes the point 32 to also pierce the diaphragm 62. Rotation of the nut 66 continues until the body members 10 and 50 assume the relationship shown in FIG. 3.

In FIG. 3 the body member 10 illustrated as rotated 90° relative to the position of FIG. 1, and it will be observed that upon complete interconnection of the body members the cylindrical portion 58 has annularly folded the diaphragm 36 back against the wall of chamber 24 as illustrated. Also, the cooperation of the bore of the cylindrical portion 58 with the tubular sleeve 26 has folded the diaphragm 62 back into an annular groove 72 defined in the bore of the cylindrical portion. Thus, it will be appreciated that the diaphragms 36 and 62 have been completely removed from the flow path of the coupling and that a relatively unrestricted passage through the coupling is provided as is apparent in FIG. 4. The resilient seal 40 will be sealingly engaging the outer cylindrical surface of the portion 58, and a final positive seal is produced by the metal-to-metal contact of the seal ring 48.

The triangular configuration of the metal seal 48 results in an annular apex at 74 and annular base angles at 76. In that the base angle ridges 76 extend in opposed directions substantially perpendicular to the radial surfaces 44 and 70 the annular ridges 76 will embed into the radial surfaces of the body members providing a positive sealing connection, FIG. 5.

It will be appreciated that due to the metal-to-metal seal, deterioration of the resilient seal will not affect the efficiency of the coupling and a trouble free assembly is insured. The resilient seal 40 will effectively seal the coupling throughout the entire coupling process and thus escape of the pressurized medium within the conduits is prevented even before the metal-to-metal seal takes place.

It should be noted that the diaphragms 36 and 62 may be secured to the bodies of the coupling halves by any suitable means. The bond between the diaphragm and the bodies should be sufficient to withstand the pressures in the lines. In practice it has been found that a proper bond may be had by soldering, brazing or glueing with an appropriate plastic material. The bond is preferably made at the circumference of the exposed faces of the diaphragms. By employing the bonding means referred to line pressures of 200 to 300 p.s.i. have been successfully handled. Higher pressures and different bonding means could be utilized, however, without departing from the scope of the invention.

It is appreciated that various modifications of the invention may be apparent to those skilled in the art, and it is intended that the invention be defined only by the following claim.

We claim:

A coupling comprising interconnectable first and second axially aligned passaged body members providing a flow path, said first body member having a cylindrical bore provided with a first rupturable diaphragm sealing said bore, a substantially cylindrical passaged member carried by first body member and extending into said bore, diaphragm piercing means carried by said cylindrical member and disposed adjacent said first diaphragm, a cylindrical passaged extension carried by and protruding from said second body member having a second rupturable diaphragm sealing the protruding end thereof, means for drawing said body members together into an axially aligned coupled assembly, the outer and inner diameters of said cylindrical extension being predetermined to allow telescoping movement of said extension between said cylindrical member and said bore and to define a first annulus formed between the outer surface of said extension and the wall of said bore and a second annulus formed between the inner surface of said extension and the outer surface of said cylindrical member whereas during the drawing together of said body members the protruding end of said extension forces said diaphragms against said piercing means and thereafter entraps at least a portion of the pierced first diaphragm in said first annulus and entraps the pierced second diaphragm in said second annulus to thereby remove said diaphragms from said flow path, and means forming a seal between said body members during and after assembly.

References Cited by the Examiner

UNITED STATES PATENTS

| | | | |
|---|---|---|---|
| 1,933,117 | 10/33 | Markle | 285—3 |
| 2,514,976 | 7/50 | Stivin | 285—336 |
| 2,933,333 | 4/60 | Bredtschneider et al. | 285—3 |
| 2,958,545 | 11/60 | Stelzer | 285—3 |

CARL W. TOMLIN, *Primary Examiner.*

EDWARD C. ALLEN, *Examiner.*